(12) United States Patent
Lucidarme et al.

(10) Patent No.: US 7,433,386 B2
(45) Date of Patent: Oct. 7, 2008

(54) METHOD OF ALLOCATING RESOURCES IN A SPACE DIVISION RADIOCOMMUNICATION SYSTEM AND EQUIPMENT FOR THE IMPLEMENTATION OF THE METHOD

(75) Inventors: Thierry Lucidarme, Montigny-le-Bretonneux (FR); Nidham Ben Rached, Paris (FR)

(73) Assignee: Alcatel Lucent, Paris (FR)

( * ) Notice: Subject to any disclaimer, the term of this patent is extended or adjusted under 35 U.S.C. 154(b) by 1107 days.

(21) Appl. No.: 10/654,182

(22) Filed: Sep. 3, 2003

(65) Prior Publication Data

US 2004/0087343 A1     May 6, 2004

(30) Foreign Application Priority Data

Sep. 4, 2002     (FR)     .................................. 02 10935

(51) Int. Cl.
*H04B 1/707*     (2006.01)
*H04B 7/216*     (2006.01)

(52) U.S. Cl. ...................... 375/146; 370/441

(58) Field of Classification Search ................. 375/140, 375/141, 146; 370/208, 209, 441, 479
See application file for complete search history.

(56) References Cited

U.S. PATENT DOCUMENTS

2003/0013451 A1*   1/2003   Walton ....................... 455/447

FOREIGN PATENT DOCUMENTS

| EP | 0 926 912 A | 6/1999 |
| EP | 1 026 911 A | 8/2000 |
| EP | 1 202 587 A | 5/2002 |

OTHER PUBLICATIONS

3G TS 25.213, version 4.1.0, "spreading and modulation (FDD)", published on Jun. 2001 by 3 GPP ("3rd Generation Partnership Project").

* cited by examiner

*Primary Examiner*—Kevin Y Kim
(74) *Attorney, Agent, or Firm*—Sughrue Mion, PLLC (57) ABSTRACT

Method of allocating communication codes to channels set up in respect of mobile terminals in communication in a cell of a radiocommunication system, in which the cell is served by a fixed station having means of adjustment of send/receive parameters defining a respective antenna pattern in respect of each mobile terminal in the cell, in which the allocated communication codes form part of a set of codes some at least of which are mutually orthogonal. In response to channel setup or reconfiguration request in respect of a first mobile terminal in the cell, the allocation to the said channel of a code nonorthogonal to at least one code of the set already allocated to another channel set up in respect of a second mobile terminal in the cell is conditionally admitted, as a function of a comparison between the send/receive parameters determined in respect of the first and second terminals.

32 Claims, 4 Drawing Sheets

METHOD OF ALLOCATING RESOURCES IN A SPACE DIVISION RADIOCOMMUNICATION SYSTEM AND EQUIPMENT FOR THE IMPLEMENTATION OF THE METHOD

BACKGROUND OF THE INVENTION

The present invention relates to the allocating of communication resources in a space division multiple access radio system. It relates more particularly to the allocating of codes in such a system.

Certain communication systems use codes consisting of binary sequences known both to a sender and to a receiver and combined with a digital signal to be transmitted, so as to allow only the receiver to which the sequence is addressed to extract this digital signal from a set of signals received. This operation is made possible by the use of codes having certain correlation properties. Such is the case for example for multiple access systems of CDMA ("Code Division Multiple Access") type.

Figure 1:
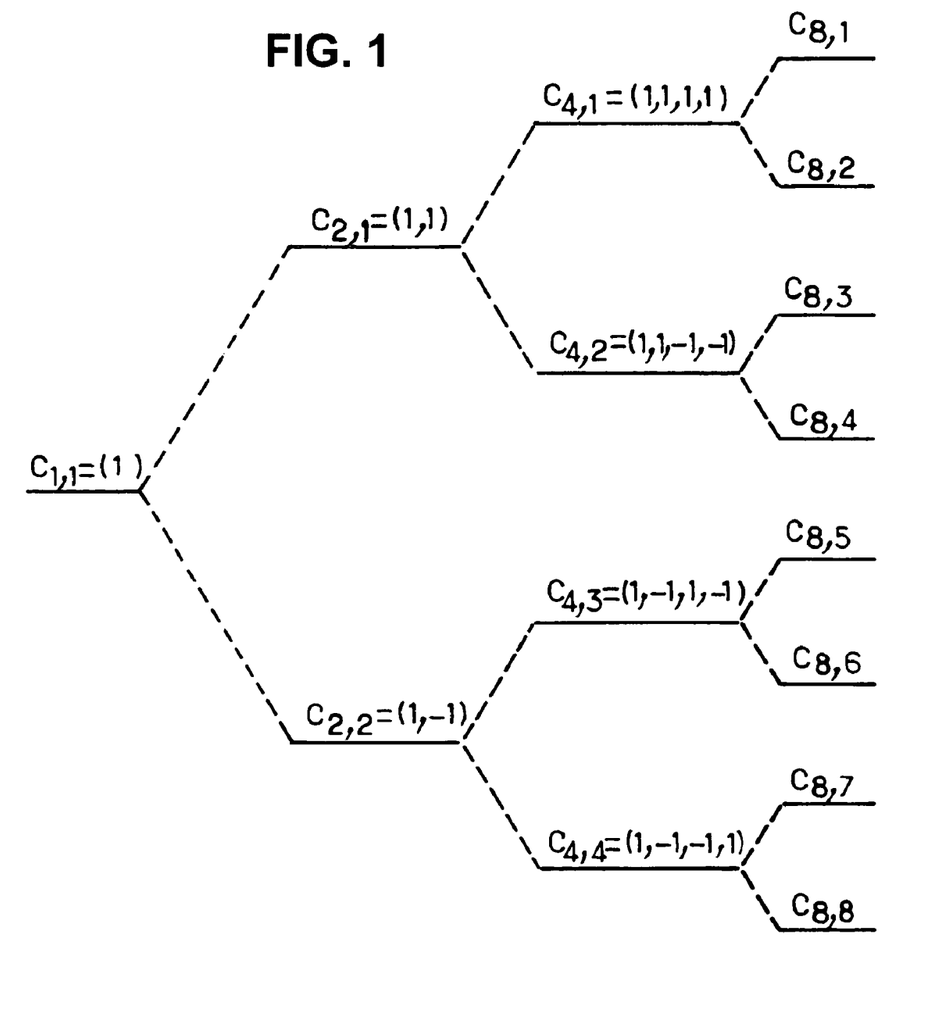
FIG. 1, previously commented on, represents the OVSF code tree used in the UMTS system.

The method is applied in particular to the allocating of orthogonal codes with variable spreading factor (OVSF, "Orthogonal Variable Spreading Factor") that are used in certain CDMA systems such as UMTS ("Universal Mobile Telecommunication System"). These OVSF codes are chosen from a set of codes of the type of the tree represented in FIG. 1. Each code $c_{SF,i}$ ($1 \leq i \leq SF$) is a sequence of SF samples called "chips", each taking the value ±1, with $SF = 2^{L-k}$, L being a positive integer (equal to 8 in the case of UMTS) and k an integer variable such that $0 \leq k \leq L$. The tree is defined by:

$c_{1,1} = (1)$,
$c_{2.SF, 2i-1} = (c_{SF,i}, c_{SF,i})$,
$c_{2.SF, 2i} = (c_{SF,i}, -c_{SF,i})$.

The chips of a channel code $c_{SF,i}$ modulate, at the rate D=3.84 Mchip/s in the case of UMTS, symbol trains whose rate is $D/SF = 2^{k-L}.D$, that is to say the spreading factor equals $SF = 2^{L-k}$. The symbols in question may be complex symbols each comprising two signed bits (of value ±1) corresponding to an I pathway and to a Q pathway.

The OVSF codes allocated to various channels are chosen in such a way as to be globally orthogonal to one and the same sender. With the code tree of FIG. 1, two codes having the same spreading factor are always orthogonal, the sum of the chip-to-chip products being zero. Two codes with spreading factors $2^{L-k}$ and $2^{L-k'}$ are orthogonal if, after they have modulated any two sequences of signed bits of respective rates $2^{k-L}.D$ and $2^{k'-L}.D$, the resulting chip sequences are orthogonal. With the tree arrangement of FIG. 1, this amounts to saying that two channel codes are orthogonal if and only if they do not belong to one and the same branch of the tree, going from the root $c_{1,1}$ to a leaf $c_{L,i}$. The selecting of the codes obeys this constraint globally: the set of channel codes used at the same instant by the sender is such that two codes are not found on the same branch. This allows the receivers to discriminate between the channels relevant to them.

In a system using such codes, it is judicious to allocate the codes in such a way that two communications which are close by, and hence liable to interfere with one another, use orthogonal codes, so as to improve the quality of these communications.

SDMA (Space Division Multiple Access) radiocommunication systems are moreover known. Such systems comprise base stations whose antenna, sometimes dubbed an intelligent or "smart" antenna, comprises a plurality of radiating elements controlled jointly so as to send to or receive from a terminal. The radiating elements may send or receive simultaneously with a weighting of the signal by a complex coefficient whose argument depends on an angular direction relating to the terminal with which the antenna is exchanging signals.

EP-A-1 026 911 describes, in respect of a radio relay having multiple send/receive capabilities in various predetermined geographic sectors, the apportioning of the codes available into several subsets, some being scheduled for use by fixed terminals situated in guard sectors, positioned between base sectors, and the others being scheduled for use by fixed terminals situated in the base sectors.

The apportioning of the codes which is disclosed in that document is well-tailored to a network where the communication terminals are fixed and where the subsets of codes may be allocated once and for all or over long periods of time, by geographical zone. On the other hand, a problem arises in radiocommunication systems where the terminals are mobile. The transposing of this scheduling scheme to radiocommunications with mobiles is problematic since it becomes necessary to make allowance for the mobility of the terminals, and in particular the case where they change sector, so as to ascertain the subset from which communication codes should be chosen for them. In fact, in a mobile radio context, each of the predetermined sectors would correspond to a distinct cell requesting its own signalling resources, involving a greater loading of the equipment in respect of the procedures for cell selection/reselection, handover, etc. Various mobile radio systems, such as UMTS, are furnished with other means for distinguishing between various cells, and the scheme of EP-A-1 026 911, intended for fixed terminals, would afford them nothing save greater complexity and lesser availability of the OVSF codes.

An object of the present invention is to propose a dynamic allocation of the resources in a space division radiocommunication system comprising mobile terminals.

Another object of the invention is to allow an allocation of codes taking account of the codes already allocated and of the actual interference measured.

Yet another object of the invention is to allow an allocation of codes taking into account the sense and/or the speed of movement of the mobile terminals.

SUMMARY OF THE INVENTION

The invention thus proposes a method of allocating communication codes to channels set up in respect of mobile terminals in communication in a cell of a radiocommunication system, in which the cell is served by a fixed station having means of adjustment of send/receive parameters defining a respective antenna pattern in respect of each mobile terminal in the cell, in which the allocated communication codes form part of a set of codes some at least of which are mutually orthogonal. In response to a channel setup or reconfiguration request in respect of a first mobile terminal in the cell, the allocation to the said channel of a code nonorthogonal to at least one code of the set already allocated to another channel setup in respect of a second mobile terminal in the cell is conditionally admitted, as a function of a comparison between the send/receive parameters determined in respect of the first and second terminals.

The method imposes no partitioning of the codes available as a function of a predefined sectorization of the cell. All the codes of the set are a priori available everywhere in the cell, and one is authorized to reuse some as a function of the dynamically observed azimuth discrepancy between the apparent directions of the terminals from the fixed station.

The method therefore leads to an increase in capability in terms of codes, and not to a constraint in the process of selecting these codes.

The send/receive parameters typically define a main send/receive direction in respect of a terminal. The said comparison can then consist in examining a criterion of discrepancy between the main send/receive directions, for example by comparing this discrepancy with a threshold. It may also make it possible to choose a code for which the discrepancy is the largest possible.

The allocating of nonorthogonal codes can be conditioned by the fact that no code orthogonal to the codes already allocated is available any longer in the cell. This makes it possible to guarantee a minimum level of interference when the traffic is weak in the cell, while the resources in terms of codes may be reused according to a good compromise when they begin to be exhausted.

Advantageously, the fixed station possesses an intelligent antenna with a plurality of radiating elements. The send/receive parameters determined in respect of a mobile terminal then comprise a fleet of weighting coefficients associated with the antenna elements in respect of a radio signal exchanged between the mobile terminal and the fixed station.

The transmission power of the radio signals exchanged between the various mobile terminals and the fixed station may also advantageously be allowed for in the comparison of parameters. This makes it possible to increase the rate of usage of nonorthogonal codes, in particular when the transmission power of a signal carried by a channel is too weak to create nuisance interference on another channel to which one wishes to allocate a code, even if the codes allocated to the two channels are not orthogonal. Thus, it is possible to allocate nonorthognal codes to channels set up in respect of mobile terminals that may be close together, but with a weak transmission power of the respective signals.

The code allocation can be effected with the setting up of a new channel or else in respect of a reconfiguration of a channel already set up. In the latter case, it is for example possible to regularly perform the comparison of send/receive parameters in respect of a set of mobile terminals and when it is detected that a criterion, for example a discrepancy criterion, is no longer fulfilled, a reconfiguration of the channel set up in respect of the relevant mobile terminal is requested.

Advantageously, other criteria enter into consideration in the choice of the code to be allocated to the channel used by a mobile terminal. Such is the case for example of a speed of movement of the mobile terminal. This is of interest insofar as it is possible with confidence to authorize the allocation of a code nonorthogonal to other codes already allocated in the cell, in respect of a terminal with low or even nonexistent mobility provided that the discrepancy criterion was previously fulfilled when setting up or reconfiguring the channel used by this terminal.

Another criterion that can be combined with the speed of movement is the sense of movement of the mobile terminals involved in the allocation. Thus, the allocation of nonorthogonal codes can be made more difficult in respect of channels used by terminals that are approaching one another than in respect of channels used by terminals that are moving away from one another.

The invention furthermore proposes a fixed station of a radiocommunication system comprising:
an antenna system for serving a cell;
means of communicating with mobile terminals in the said cell by way of the antenna system according to channels to which communication codes are respectively allocated;
means of adjustment of send/receive parameters defining a respective antenna pattern in respect of each mobile terminal in the cell;
means of transmission, to a station controller, of information relating to the send/receive parameters determined in respect of some at least of the mobile terminals; and
means of reception, from the station controller, of a command for allocating to a channel a code determined by the station controller as a function of some at least of the said information transmitted, relating to the send/receive parameters.

This fixed station is in particular tailored to centralized systems where a station controller implements algorithms for managing resources, in particular allocation of communication codes, on the basis of data and of measurements transmitted by the radio transmission network.

The invention also proposes a station controller in a radiocommunication system furthermore comprising a fixed station comprising an antenna system for serving a cell and able to communicate with mobile terminals in the said cell by way of the antenna system according to channels to which communication codes are respectively allocated, the said fixed station having means of adjustment of send/receive parameters defining a respective antenna pattern in respect of each mobile terminal in the cell. The station controller comprises:
means for receiving, from the said fixed station, information relating to the said send/receive parameters determined in respect of some at least of the mobile terminals;
means for receiving a setup request and means for generating a reconfiguration request for a channel in respect of a first mobile terminal in the cell;
means of conditional allocation, to the said channel, in response to the said request, of a code nonorthogonal to at least one code of the set already allocated to another channel set up in respect of a second mobile terminal in the cell, as a function of a comparison between the information received, relating to the send/receive parameters determined in respect of the first and second terminals.

DESCRIPTION OF PREFERRED EMBODIMENTS

The technique of space division multiple access uses so-called smart (or intelligent) antennas, sometimes referred to as beam forming antennas, having the feature of comprising several radiating elements. Each radiating element, which may be of any type (large antenna, elementary source, dielectric focusing source, cross-polar antenna, etc), has a specific contribution within a send or a receive. The contributions generally depend on the angular position of the mobile terminal involved in the transmission with respect to the intelligent antenna. Thus, it is possible to send or receive a signal at antenna level in a manner which favours the direction of the mobile terminal.

Figure 2:
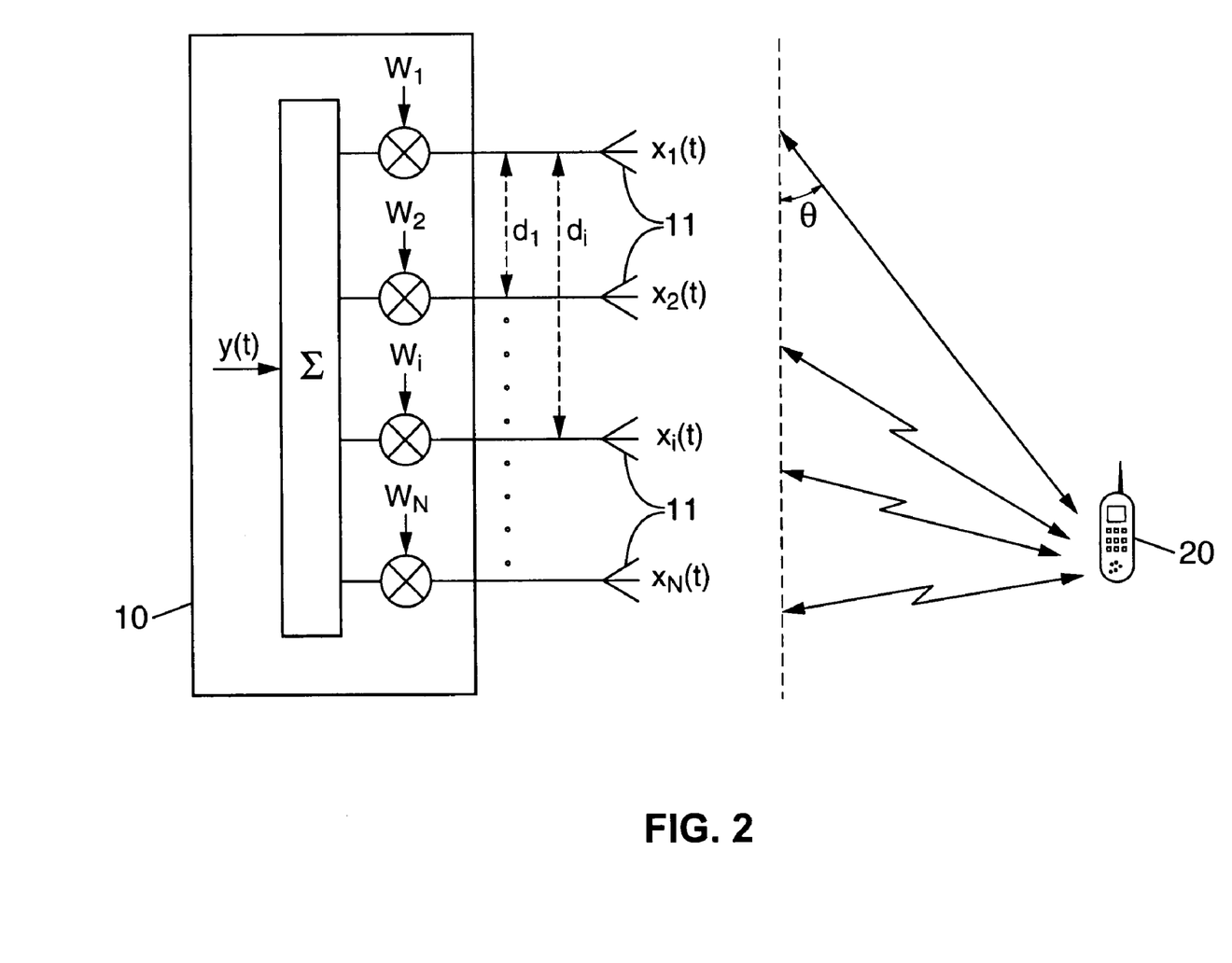
FIG. 2 is a basic diagram of an intelligent antenna.

FIG. 2 illustrates the manner of operation of such antennas. The entity 10 is a base station forming part of a radiocommunication system, such as for example UMTS. It communicates with the mobile terminal 20 by way of an intelligent antenna that has been represented in the figure as forming an integral part of the base station.

A signal y(t) to be transmitted by the base station 10 to the terminal 20 is sent partially by each of the N radiating elements 11 represented in FIG. 2, (N>1). The signal y(t) is replicated into N signals $x_i(t)$ weighted by respective coefficients $w_i$ ($1 \leq i \leq N$) before being applied to the radiating elements.

The prior art distinguishes several types of intelligent antennas, the principle of which is however much the same.

So-called lobe switching antennas are known that differ in particular as a function of the number of predetermined lobes available. The optimal lobes that one wishes to use are chosen from the predetermined lobes, as a function of the quality of the signals received at antenna level. Subsequently, other lobes may possibly be brought into play as a function of the movement of the mobile terminal. This switching may be carried out in a conventional manner by couplers implementing Buttler matrices.

Another type of antenna, the so-called "adaptive array antenna", makes it possible moreover to maximize, for a given mobile terminal, the signal-to-interference ratio, by creating an antenna pattern whose "zeros", that is to say locations with very weak transmission or reception power, are in the direction of the interferers of the mobile terminal in question.

Figure 3:
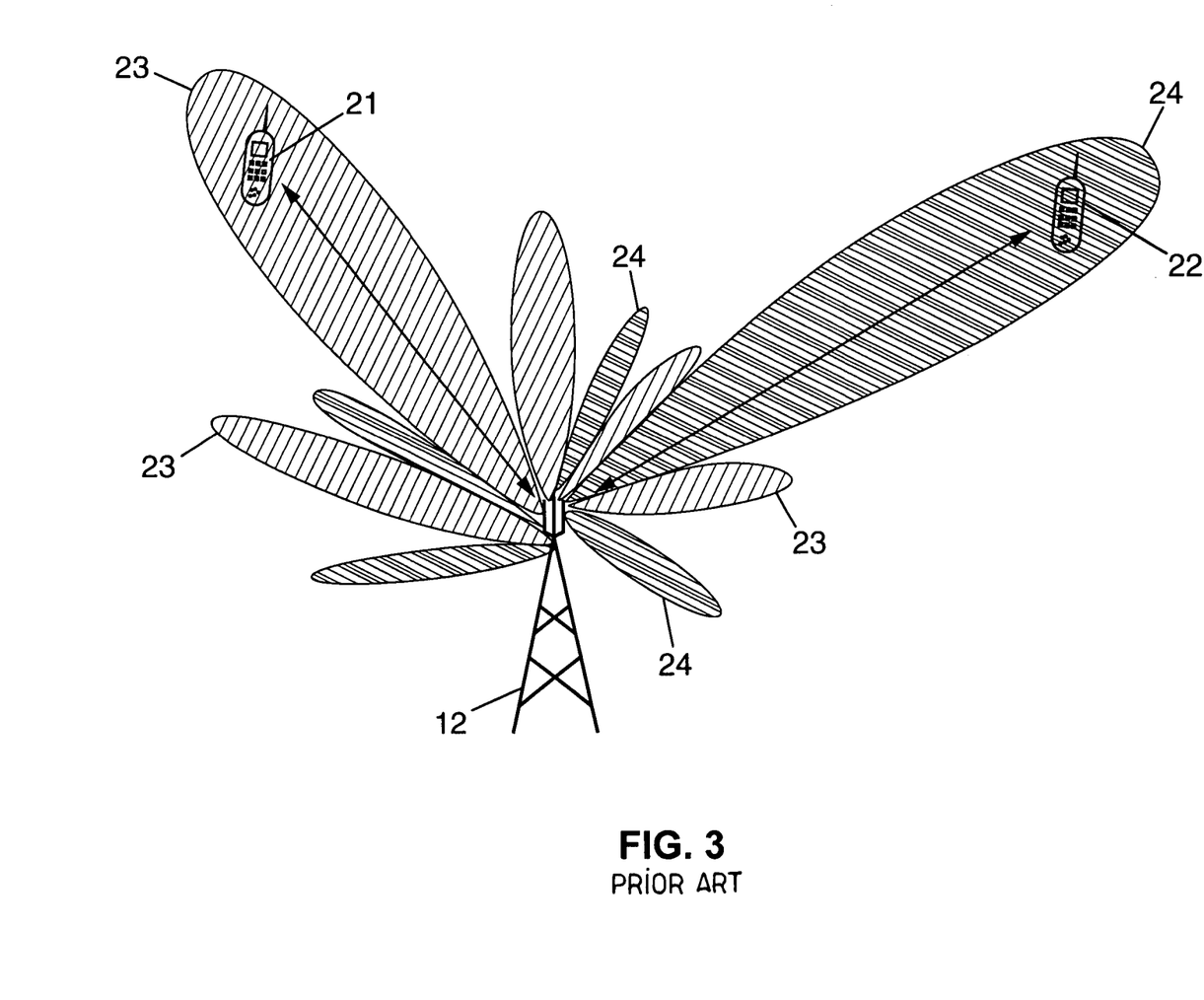
FIG. 3 is a diagrammatic representation of adaptive array intelligent antenna patterns.

This principle is illustrated in FIG. 3 where two terminals 21 and 22 are in communication with the base station 12. The lobes 23 and 24 of the adaptive array antenna of the base station 12 are oriented mainly towards the two terminals 21 and 22 respectively. The figure clearly shows that the signal-to-noise ratio is maximized for each of the two terminals since the overlap of the lobes 23 and 24 is limited.

The coefficients $w_i$ of the various radiating elements 11 are weightings making it possible to use antenna lobes that are favourable in the direction of the mobile terminal 20. Typically, these are complex coefficients whose argument depends on the angular position θ of the mobile terminal 20 with respect to the antenna. If $d_j$ denotes the distance, calculated as a number of λ/2 (λ being the radio wavelength), which separates the (i+1)th radiating element from the first radiating element, these two elements receive or send with a geometrical phase shift of $2\pi.d_j.\cos(\theta)/\lambda$. The radiocommunication system may take the coefficients $w_i$ of the form:

$$w_i = \frac{1}{\sqrt{N}} \times e^{-j\pi \cdot d_j \cdot \cos(\theta)}.$$

However, other expressions of the contributions may be used, in the case of adaptive array antennas to minimize the contributions of the other signals in directions other than the useful signal.

Intelligent antennas as described hitherto make it possible to send and also to receive in a way which is more favourable in the direction of the relevant mobile terminal. When receiving, that is to say in the uplink sense, from the mobile terminal 20 to the base station 10, the radiating elements are used as sensors. Signals $x_i(t)$ are picked up by these elements and are subsequently weighted by respective coefficients $w_i$. The signals thus weighted are then summed to retrieve the useful signal y(t).

Moreover, a system envisaged in the present invention uses, for the coding of its communications, codes which are advantageously of OVSF type, as described previously with reference to FIG. 1. For example, within the framework of the UMTS system, the codes in question may be the channel codes described in sections 4.3.1 and 5.2.1 of the technical specification 3G TS 25.213, version 4.1.0 published in June 2001 by the 3GPP ("3rd Generation Partnership Project"). The UMTS system also makes provision for a second coding by scrambling codes (see sections 4.3.2 and 5.2.2 of the aforesaid 3G TS 25.213 specification). The latter are often used at a rate of one code per base station in the downlink sense, that is to say for transmissions from the base station to a mobile terminal, or per mobile terminal in the uplink sense, that is to say for the transmissions from the mobile terminal to the base station. The invention may also be applied in respect of the joint use of these two types of codes.

The codes mentioned hereinabove have variable lengths given by the spreading factor SF in number of chips. A channel with low SF exhibits a high bit rate, whereas a channel with high SF exhibits a low bit rate.

The number of codes being limited, it is desirable to reuse the codes available as far as possible.

The use of codes is subjected to an allocation for each communication. In the UMTS system for example, a base station controller, called the RNC ("Radio Network Controller"), is responsible for allocating the codes for each base station that it controls. For this purpose, each base station sends back up to the RNC a report of measurements that it performs regularly on the uplinks. The mobile terminals present in the zone of coverage of base stations under the responsibility of the RNC send it back, in the same manner, reports of measurements on the downlinks. The manner in which the RNC allocates the codes may follow various rules at the choice of the RNC manufacturer and/or of an operator working such a radiocommunication network. In other systems, it is of course possible for the base stations themselves to allocate codes in respect of the mobile terminals that they control.

According to the invention, a base station or fixed station communicating with mobile terminals must be able to orient its send/receive in a main direction for each terminal. Although other types of base station may be envisaged, the case of a base station having a plurality of radiating elements is dealt with hereinafter. The allocating of the codes in respect of communication channels between each mobile terminal and the base station is then performed taking account of the weighting coefficients associated with each of the radiating elements of the antenna of the base station.

Figure 4:
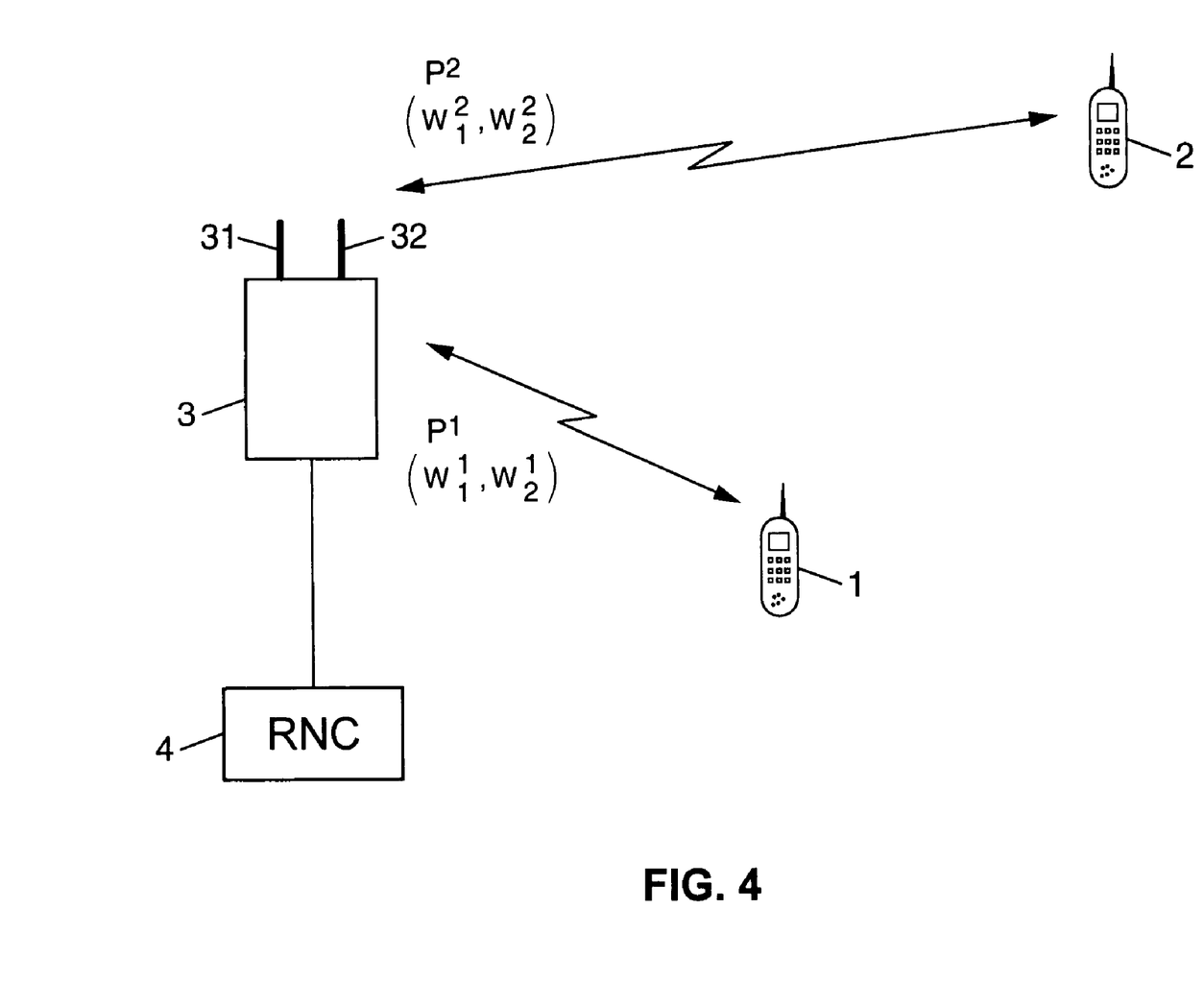
FIG. 4 is a schematic diagram of an exemplary system implementing the invention.

FIG. 4 illustrates a simple system implementing the invention. The base station 3 comprises two radiating elements 31-32. They service a cell within the coverage of which are located mobile terminals 1-2, with which the base station 3 exchanges radio signals. Optionally, for example within the framework of the UMTS system, an RNC 4 is connected to the base station 3 and controls the radio network thus constructed.

From hereon, in a nonrestrictive manner, the case of downlink channels in accordance with the system of FIG. 2, that is to say in respect of transmissions from the base station 3 to the terminals 1-2, will be dealt with. However, the invention described hereinbelow applies in the same manner in respect of uplink channels.

It is considered that the base station 3, hereinafter dubbed SB 3, sends signals towards the mobile terminal 2, hereinafter dubbed TM 2, by way of its radiating elements 31-32, in the course of a communication C2 using a code c2. This sending has the following characteristics: transmission power $P^2$ and contributions $w_1^2$ and $w_2^2$, respectively, for the radiating elements 31 and 32. In the notations used here, the indices thus relate to the radiating elements of SB 3 and the exponents relate to the mobile terminals involved (TM 1 or TM 2).

When a communication C1 is to be set up or is in progress between SB 3 and TM 1, parameters characteristic of the communication are available, for example in the downlink sense: transmission power $P^1$ and contributions $w_1^1$ and $w_2^2$, respectively, for the radiating elements 31 and 32. If the communication is already set up, these parameters are known and are updated regularly, in particular, as regards the transmission power, by virtue of a conventional power control procedure. In certain systems, the transmission power is determined by a central controller of stations or else it is transmitted thereto by the base stations and the mobile terminals when the latter so choose by themselves. Thus, the station controller is capable of determining at any instant the transmission power of the signals on each radio channel that it controls.

When the communication C1 has not yet been set up, a transmission power $P^1$ can be presupposed for the start of the communication, for example the maximum power permitted by SB 3, and the weighting coefficients of the radiating elements are known, since they have formed the subject of a prior determination on signalling channels used between SB 3 and TM 1 before any exchange on traffic channels.

A code c1 must be allocated to the downlink channel, bearing the communication C1. According to the invention, this allocation depends on the weighting coefficients of the radiating elements for certain channels. Thus, in the example illustrated by FIG. 2, it will be possible to perform the allocation on the basis of certain of the coefficients: $w_1^2, w_2^2, w_1^1$ and $w_2^1$. Advantageously, a criterion for allocating c1 to the channel bearing the communication C1 will also take into account the transmission powers $P^1$ and $P^2$.

The useful signal received by TM 1 is the sum of the contributions of each radiating element SB 3, that is to say it is of the form: $\sqrt{P^1}.f_1.w_1^1 + \sqrt{P^1}.f_2.w_2^1$, where $f_1$ and $f_2$ respectively designate the attenuation, or fading, during the transmission of a signal from SB 3 to TM 1. In the same manner, the nuisance signal, that is to say the interference originating from the communication C2 on the communication C1, may be written in the form: $\sqrt{P^2}.f_1.w_1^2 + \sqrt{P^2}.f_2.w_2^2$. The use of an intelligent antenna for SB 3 affords optimization of the signal, aimed at maximizing its level of reception at the level of TM 1. This is conventionally carried out by adjusting the weighting coefficients of the radiating elements, in such a manner that $w_1^1$ is equal to $f_1^*$ and that $w_2^1$ is equal to $f_2^*$, where $f_1^*$ and $f_2^*$ designate the conjugate numbers of the complex numbers $f_1$ and $f_2$ respectively. Thus, the useful signal for TM 1 may be written in the following manner: $\sqrt{P^1}.w_1^{1*}.w_1^1 + \sqrt{P^1}.w_2^{1*}.w_2^1$. The same optimization taking place on the useful signal received by TM 2, one deduces therefrom that the signal/interference ratio, for TM 1 of FIG. 2, after optimization, is of the form: $R = \sqrt{P^1}.(w_1^{1*}.w_1^1 + w_2^{1*}.w_2^1)/\sqrt{P^2}.(w_1^{1*}.w_1^2 + w_2^{1*}.w_2^2)$.

According to the invention, the allocation of a code c1 orthogonal to c2 may therefore be subjected to a comparison of the ratio R with a real number $\epsilon$. Thus, for example, if R is greater than $\epsilon$, this signifying that the ratio of the useful signal to the interference, seen from TM 1, is above a threshold, the use of the code c1 for the communication C1 will not suffer excessively from interference created by the communication C2. Conversely, if the ratio R is less than the real $\epsilon$, it is possible to decide to allocate a code c1 orthogonal to c2 to the channel that bears the communication C1, in such a way as to avoid experiencing, seen from TM 1, strong interference originating from the communication C2.

Of course, other combinations of the weighting coefficients of the radiating elements and/or of the transmission powers may be envisaged for deciding the allocation of a code c1 to the communication C1, orthogonal or not to the code c2 used by the communication C2. For example, one considers the ratio that maximizes the interference originating from C2 by making the assumption that the power $P^2$ is a maximum, so that the ratio R is a minimum. Thus, if R is greater than $\epsilon$, at a given instant, it will still be so after an increase in power for the communication C2. This makes it possible to ensure a certain durability to the quality of the communication C1, when the channel bearing this communication has been allocated a code c1 nonorthogonal to c2, even when TM 2 moves towards SB 3.

Moreover, the value of the real $\epsilon$ may be fixed or variable. It may for example depend on the environment (urban, rural, etc). It may also take different values according to the spreading factor envisaged for c1, so that one is certain for example to have a higher ratio R to allocate a code of lower spreading factor for the communication C1, or vice versa.

The exemplary embodiment described above and illustrated by FIG. 4 may be generalized to a large number of mobile terminals in communication with a base station and to a high number of radiating elements for this base station. In this case, the invention makes provision as before, in respect of the allocating of a code c1 to a channel bearing a communication C1 with a mobile terminal k, with $1 \leq k \leq M$ and $M \geq 2$, for an evaluation on the basis of the coefficients of the radiating elements for certain communications in progress using a code nonorthogonal to c1.

Thus, in a configuration where a base station possesses an antenna with N radiating elements, with $N \geq 2$, and holds communications C2 according to respective communication channels with M−1 mobile terminals, these channels use codes nonorthogonal to a code c1. A kth communication with the terminal k may see itself allocated the code c1, if a comparison of send/receive parameters determined in respect of the terminal k on the one hand and the other M−1 terminals on the other hand is satisfied. In an advantageous embodiment which is an extension of the case described previously, this comparison depends on the contributions $w_i^j$ and possibly on the transmission powers $P^j$, where $1 \leq i \leq N$, $1 \leq j \leq M$ and $j \neq k$. It may thus be based on the ratio $$\frac{\sum_{i \in \{1 \ldots N\}} \sqrt{P^k} \times (w_i^{k*} \cdot w_i^k)}{\sum_{j \in \{1 \ldots M\}, j \neq k} \sqrt{P^j} \times \left( \sum_{i \in \{1 \ldots N\}} w_i^{k*} \cdot w_i^j \right)}.$$

Thus, the code c1 nonorthogonal to the codes c2 already allocated in respect of the channels bearing the communications C2 may be allocated to the channel for communication with the mobile terminal k if the above ratio has a value greater than a chosen threshold $\epsilon$.

Advantageously, the allocation of a code for the communication of TM k may be performed by evaluating such a ratio over several sets of communications using codes nonorthogonal to a code ck. The code ck ultimately chosen for the communication with TM k may then be that for which the ratio thus calculated is a maximum. Stated otherwise, for a given channel, the code fulfilling the following criteria is allocated, the criteria being evaluated for several sets of communications with TMs having codes nonorthogonal to the code that one envisages allocating:

$$\frac{\sum_{i\in\{1\ldots N\}}\sqrt{P^k}\times(w_i^{k*}\cdot w_i^k)}{\sum_{j\in\{1\ldots M\},j\neq k}\sqrt{P^j}\times\left(\sum_{i\in\{1\ldots N\}}w_i^{k*}\cdot w_i^j\right)}\geq\varepsilon\text{ and}$$

$$\frac{\sum_{i\in\{1\ldots N\}}\sqrt{P^k}\times(w_i^{k*}\cdot w_i^k)}{\sum_{j\in\{1\ldots M\},j\neq k}\sqrt{P^j}\times\left(\sum_{i\in\{1\ldots N\}}w_i^{k*}\cdot w_i^j\right)}\text{ is a maximum}$$

Typically, the denominator of the ratio is calculated for a few TMs out of the set of TMs having communications with the base station using codes nonorthogonal to a code that one envisages allocating According to an embodiment of the invention, the allocation of a code nonorthogonal to codes already allocated in respect of channels for communication between mobile terminals and a base station is subject to a criterion such as those described hereinabove, on condition that no code orthogonal to all the other codes already allocated in respect of communications with the base station is available any longer in the set of channels provided by the system used. Thus, the allocation of a code orthogonal to all the other codes already allocated is promoted, as long as the resources in terms of codes usable within the framework of the communications with the base station are not exhausted. This makes it possible to limit interference, in particular when the number of communications with the base station is not too high.

The allocation of a code in respect of a communication channel, according to the invention, may be performed when setting up this channel. In this case, it follows on from a channel setup request, which may for example be transmitted from a mobile terminal, wishing to initiate a communication to a station controller by way of a base station.

The allocation may also be performed in the course of a communication. In this latter case, the allocation is in fact a reallocation. It forms the subject of a request to reconfigure the channel used for the communication. This request may for example be generated by the station controller, in particular if it evaluates that a discrepancy criterion previously fulfilled in respect of a mobile terminal is no longer so. Such a reallocation of a new code in respect of the communication channel may be performed according to the principles set forth earlier, in the same manner as a first allocation. In a particular embodiment, the evaluation of the discrepancy criterion may be performed at certain predetermined instants, for example periodically, with a view to a possible channel reconfiguration. If the periodic mode is used, the period may be variable, for example as a function of a number of already allocated nonorthogonal codes.

As was specified earlier, all the principles described here are applicable in the same manner in respect of downlink channels, that is to say channels carrying information sent by a fixed station to a mobile terminal, and in respect of uplink channels, that is to say channels carrying information sent by a mobile terminal to a fixed station.

In an embodiment where the allocation is centralized at the level of a station controller, as in the UMTS system where the RNC 4 takes the decision on the codes to be allocated, it is this controller that performs the evaluation of the above discrepancy criterion on the basis of the information reports transmitted by the base station and containing in particular the weighting coefficients associated with the radiating elements of a fixed station in respect of radio signals exchanged between the fixed station and certain mobile terminals.

Advantageously, the allocation of the codes takes into account, furthermore, an estimation of the speed of movement of mobile terminals. This estimation of speed may be of any type. The estimated speeds are subsequently taken into account in the criteria for allocating a code. Thus, the allocation of code in respect of a communication channel between a mobile terminal and a fixed station may be such that the code allocated to the said communication is preferably orthogonal to the codes already allocated in respect of other communication channels if the relevant mobile terminal has an estimated speed greater than a threshold. Conversely, in respect of a communication channel with a mobile terminal having a low estimated speed by comparison with a threshold, it will be possible to admit the allocation of a code nonorthogonal to other codes already used in respect of communication channels with the base station, on condition however that a discrepancy criterion such as that described earlier is fulfilled.

In another advantageous embodiment, the estimation of speed is taken into account in the allocation of codes, performed for example under the responsibility of a station controller, by hardening or on the contrary by softening the criterion to be complied with by a comparison between the weighting coefficients of the antenna in respect of radio signals exchanged with a first mobile terminal and with second mobile terminals, as described earlier. For example, the value of the real $\varepsilon$ with which a ratio representative of a signal/interference ratio is compared may be increased when the estimated speed of the first mobile terminal considered is high and decreased when the estimated speed of the first mobile terminal considered is low in comparison with a speed threshold.

Advantageously, the estimated speed may be an angular speed. Specifically, a mobile terminal moving perpendicularly to a radius of the cell served by a fixed station may easily find itself, on completion of this movement, in a zone where codes nonorthogonal to that allocated to a channel on which it is communicating are used. Thus, a high angular speed may lead to the necessity for fast and repeated reallocations of codes. This may then be avoided by taking account of the angular speed in the allocating of the codes, as described hereinabove.

Advantageously, the angular speed of a mobile terminal may be estimated on the basis of the weighting coefficients associated with the antenna elements of the fixed station considered in respect of radio signals exchanged between the fixed station and the mobile terminal. For this purpose, certain of the weighting coefficients are stored, for example at the level of the base station or indeed of a station controller after the fixed station has transmitted these coefficients to it. The estimation of the speed of the mobile terminals then consists in calculating a variation of the weighting coefficients over time.

Continuing with the notation of FIG. 4, this signifies that the estimation of the speed of TM 1 can be done by storing the values of the coefficient's $w_1^1$ and/or $w_2^1$. Let for example $w^{11}$ (t) be the value of $w_1^1$ at the instant t and $w_1^1$ (t+1) the value of $w_1^1$ at the instant t+1. The estimation of the speed of TM 1 may then be deduced from a rate of variation of $w_1^1$ between the instants t and t+1, that is to say $w_1^1$ (t+1)−$w_1^1$ (t). This evaluation is made possible by the fact that the coefficients associated with the radiating elements are conventionally chosen by the base station to send or receive mainly in the direction of the mobile terminal considered.

Of course, other speed estimators may be used on the basis of the weighting coefficients. For example, in the above case, the calculation of a second estimator $w_2^1(t+1)-w_2^1(t)$ may make it possible to refine the estimation of the speed for TM 1, in combination with the above estimation. Thus, the estimation of the speed of TM 1 may be an average of the form: $\frac{1}{2}\times(w_1^1(t+1)-w_1^1(t)+w_2^1(t+1)-w_2^1(t))$. Yet other estimations may be based on a rate of variation of the contributions over a longer time period, for example between nonconsecutive instants of evaluation. Further, this estimation may of course be generalized to the case where the base station involved in the communication has more than two radiating elements.

According to an advantageous embodiment of the invention, the allocation of codes takes into account moreover a sense of movement estimated for certain mobile terminals. Any type of known estimator of the sense of movement of a mobile terminal may be envisaged for this purpose. The estimation may in particular be carried out by a station controller on the basis of information transmitted by the fixed station in communication with the terminal. Thus, it is advantageously possible to preferably allocate to a communication channel between a first mobile terminal and a fixed station a code orthogonal to codes already used in respect of communication channels between other mobile terminals and the said fixed station, when the estimation of the sense of movement reveals that the first mobile terminal is approaching at least one of the other mobile terminals or else that at least one of these other terminals is approaching the first mobile terminal. Conversely, if the estimation of the senses of movement reveals that there is no approaching of the first terminal and the other terminals, or even that they are moving away from one another, it is preferably possible to allocate to the channel used by the first mobile terminal a code nonorthogonal to the codes used by the channels used by the other mobile terminals. This precaution makes it possible to limit the interference which would result from a movement of the mobile terminals towards one another and hence from the close use of nonorthogonal codes. At the same time, this allows optimization of the management of the resources by the authorization of a usage of nonorthogonal codes when the risks of increase of interference are low because the mobile terminals concerned are moving away from one another.

The taking into account of the sense of movement in the allocating of the codes may be based on a comparison between the send/receive parameters determined in respect of various terminals, whose value may for example be compared with a higher or lower threshold according to the sense of movement of the mobile terminals considered. For example, in the configuration illustrated by FIG. 4, the channel used for the communication C1 of TM 1 with SB 3 may be allocated a code c1 nonorthogonal to a code c2 used for a channel used for the communication C2 of TM 2 with SB 3, if a discrepancy criterion based on the coefficients associated with the radiating elements 31-32 is fulfilled and if the estimation of the sense of movement of TM 1 and/or of TM 2 reveals that these terminals are not approaching one another. Conversely, the code c1 allocated to a channel in respect of the communication C1 will preferably be orthogonal to the code c2, if the estimation of the sense of movement of TM 1 and/or of TM 2 reveals that these terminals are approaching one another.

In another embodiment, the detection of an approaching of TM 1 and TM 2, by virtue of the estimation of the senses of movement of these mobile terminals, may harden the discrepancy criterion in respect of the allocation of a code c1 nonorthogonal to c2, for example by assigning the real $\epsilon$ described previously a very high value. On the other hand, the value of the real $\epsilon$ may be reduced when evaluating the discrepancy criterion in respect of the allocation of a code c1 nonorthogonal to c2, when the estimation of the sense of movement of TM 1 and TM 2 reveals that at least one of these mobile terminals is moving away from the other.

Advantageously, the taking into account of the estimation of the speed and of the estimation of the sense of movement of the mobile terminals, in the allocating of the resources of codes, will be done jointly. Thus, it is possible to favour the allocation of orthogonal codes in the first place in respect of channels used by mobile terminals approaching one another fast, whereas an allocation of nonorthogonal codes will be favoured in respect of channels used by terminals not interfering with one another overly in view of a criterion based on weighting coefficients associated with antenna elements of a fixed station, as described previously, and that are not approaching one another at high speed.

Of course, the present invention is not limited to the case of radiocommunication systems of the UMTS type.

Furthermore, the codes that it brings into play may be of a nature other than the channel or scrambling codes used in particular in the UMTS system. For example, certain frequency division multiple access radiocommunication systems use frequency hopping, that is to say a communication channel between a mobile terminal and a fixed station of such a system possesses a carrier frequency varying, with a very short period, according to a predetermined sequence. In such a case, the codes of the present invention designate these sequences of successive frequencies, some at least of which are mutually orthogonal. The allocating of the sequences according to the invention then makes it possible to limit the interference between the channels while authorizing uses of nonorthogonal sequences in respect of communication channels set up in respect of distinct mobile terminals, when a criterion based on a comparison of send/receive parameters determined respectively for these terminals is fulfilled.

The invention claimed is:

1. A method for allocating communication codes to channels set up in respect of mobile terminals communicating in a cell of a radiocommunication system, in which the cell is served by a fixed station having means for adjusting send/receive parameters defining a respective antenna pattern in respect of each mobile terminal in the cell, in which the allocated communication codes form part of a set of codes, a plurality of which are mutually orthogonal, said method comprising:

in response to a channel setup or reconfiguration request for a first mobile terminal in the cell, allocating a code to the channel;

wherein the allocation to the channel of a code that is nonorthogonal to at least one code of the set that is already allocated to another channel set up in respect of a second mobile terminal in the cell is conditioned on at least a comparison between the send/receive parameters determined in respect of the first and second terminals.

2. The method according to claim 1, wherein the allocation of a code that is nonorthogonal to at least one code of the set already allocated is further conditioned on at least the condition that the said setup or reconfiguration request occurs while the set no longer comprises any code tailored to the channel to be set up or to be reconfigured and orthogonal to all the communication codes already allocated.

3. The method according to claim 1, wherein the send/receive parameters define, in respect of each mobile terminal in the cell, a main send/receive direction and wherein the comparison between the send/receive parameters determined in respect of the first and second terminals comprises a criterion of discrepancy between the main directions defined in respect of the first and second terminals.

4. The method according to claim 1, wherein the allocation to the said channel of a code nonorthogonal to at least one code of the set already allocated to another channel set up in respect of a second mobile terminal in the cell is further conditioned on at least the condition that the comparison between the send/receive parameters determined in respect of the first and second terminals exhibits a discrepancy greater than a threshold.

5. The method according to claim 1, wherein a code nonorthogonal to at least one code already allocated to another channel set up in respect of a second terminal is selected from among the codes of the set of codes that are not allocated as the communication code to be allocated to the channel to be set up or to be reconfigured in respect of the said first terminal such that the said comparison between the send/receive parameters determined in respect of the first and second terminals exhibits a maximum discrepancy.

6. The method according to claim 1, wherein an antenna of the fixed station comprises a plurality radiating elements, each associated with a respective weighting coefficient, and wherein the send/receive parameters determined in respect of a mobile terminal in the cell comprise a plurality of complex weighting coefficients associated with the antenna elements in respect of a radio signal exchanged between the terminal and the fixed station.

7. The method according to claim 6, wherein the comparison between the send/receive parameters determined in respect of the first and second terminals furthermore depends on a respective transmission power of the radio signals exchanged between the first and second terminals and the fixed station.

8. The method according to claim 7, in which an integer k designates the first terminal and an integer M greater than or equal to 2 is such that there exist M−1 second terminals, in which the complex weighting coefficients $w_i^j$, with $1 \leq i \leq N$, $N \geq 2$, j integer different from k, are associated with the radiating elements i of an antenna of the fixed station in respect of a radio signal exchanged with a mobile terminal j from among the M−1 second mobile terminals, in which the complex weighting coefficients $w_i^k$ are associated with the radiating elements i in respect of a radio signal exchanged with the mobile terminal k, in which $p^j$ and $p^k$ are the transmission powers in respect of the radio signals exchanged between the fixed station and the mobile terminal j and the mobile terminal k respectively, and in which the comparison between the send/receive parameters determined in respect of the first and second terminals corresponds to the ratio $$\frac{\sum_{i \in \{1 \ldots N\}} \sqrt{P^k} \times (w_i^{k*} \cdot w_i^k)}{\sum_{j \in \{1 \ldots M\}, j \neq k} \sqrt{P^j} \times \left( \sum_{i \in \{1 \ldots N\}} w_i^{k*} \cdot w_i^j \right)}.$$

9. The method according to claim 1, wherein the comparison between the send/receive parameters determined in respect of the first and second terminals is evaluated periodically so as to request a reconfiguration of the channel in respect of the first terminal.

10. The method according to claim 1, wherein the channels are downlinks.

11. The method according to claim 1, wherein the channels are uplinks.

12. The method according to claim 1, furthermore comprising an estimation of speed of at least the first mobile terminal and wherein the allocation of a code to the channel to be set up or to be reconfigured in respect of the first terminal furthermore depends on the estimated speed.

13. The method according to claim 12, wherein the estimation of speed comprises an estimation of angular speed of the mobile terminal comprising a storage of some at least of the send/receive parameters determined in respect of the mobile terminal and an estimation of a variation of the send/receive parameters over a time period.

14. The method according to claim 12, wherein the allocation to the channel to be set up or to be reconfigured in respect of the first mobile terminal of a code nonorthogonal to at least one code of the set already allocated to another channel set up in respect of a second mobile terminal in the cell is moreover conditioned on at least the condition that the estimated speed of the first mobile terminal is less than a speed threshold.

15. The method according to claim 1, furthermore comprising an estimation of a sense of movement of the first and second mobile terminals and wherein the allocation of a code to the channel to be set up or to be reconfigured in respect of the first mobile terminal furthermore depends on the estimations of the senses of movement.

16. The method according to claim 15, wherein the allocation to the channel of a code nonorthogonal to at least one code of the set already allocated to another channel set up in respect of a second mobile terminal in the cell conditioned on at least the comparison of the send/receive parameters is subjected to a more severe condition if the estimations of the senses of movement show a mutual approaching of the first terminal and the second terminal.

17. The method according to claim 1, wherein the send/receive parameters determined in respect of some at least of the mobile terminals are transmitted by the fixed station to a station controller and wherein the allocation of code is performed by the station controller.

18. A fixed station of a radiocommunication system comprising:
    an antenna system serving a cell;
    means for communicating with mobile terminals in the cell by way of the antenna system according to channels to which communication codes are respectively allocated;
    means for adjusting send/receive parameters defining a respective antenna pattern in respect of each mobile terminal in the cell;
    means for transmitting, to a station controller, information relating to the send/receive parameters determined in respect of some at least of the mobile terminals; and
    means for receiving from the station controller, a command to allocate to a channel a code determined by the station controller as a function of at least a comparison of at least some of the information transmitted, relating to the send/receive parameters.

19. The fixed station according to claim 18, wherein the antenna system comprises a plurality radiating elements, each associated with a respective weighting coefficient, and wherein the information relating to the send/receive parameters determined in respect of a mobile terminal comprise a plurality of complex weighting coefficients associated with the antenna elements in respect of a radio signal exchanged between the terminal and the fixed station.

20. A station controller in a radiocommunication system comprising a fixed station that comprises an antenna system for serving a cell and able to communicate with mobile terminals in the cell by way of the antenna system according to channels to which communication codes are respectively allocated, in which the allocated communication codes form part of a set of codes, a plurality of which are mutually orthogonal, the fixed station further comprising means for adjusting send/receive parameters defining a respective antenna pattern in respect of each mobile terminal in the cell, the station controller comprising:

means for receiving from the fixed station information relating to the send/receive parameters determined in respect of some at least of the mobile terminals;

means for receiving a setup request and means for generating a reconfiguration request for a channel in respect of a first mobile terminal in the cell;

means for conditionally allocating to the channel, in response to the request, a code nonorthogonal to at least one code of the set already allocated to another channel set up in respect of a second mobile terminal in the cell, as a function of a comparison between the information received, relating to the send/receive parameters determined in respect of the first and second terminals.

21. The station controller according to claim 20, wherein the means for conditionally allocating performs the allocation of a code nonorthogonal to at least one already allocated code of the set only in response to a setup or reconfiguration request occurring while the set no longer comprises any code tailored to the channel to be set up or to be reconfigured and orthogonal to all the communication codes already allocated.

22. The station controller according to claim 20, wherein the send/receive parameters define, in respect of each mobile terminal in the cell, a main send/receive direction and wherein the comparison between the information relating to the send/receive parameters determined in respect of the first and second terminals comprises a criterion of discrepancy between the main directions defined in respect of the first and second terminals.

23. The station controller according to claim 20, wherein the antenna system of the base station comprises a plurality radiating elements, each associated with a respective weighting coefficient, and wherein the information received, relating to the send/receive parameters determined in respect of each mobile terminal in the cell comprises a plurality of complex weighting coefficients associated with the antenna elements in respect of a radio signal exchanged between the terminal and the fixed station.

24. The station controller according to claim 23, furthermore comprising means for determining a transmission power of a radio signal exchanged between each mobile terminal and the fixed station, wherein the comparison between the information relating to the send/receive parameters determined in respect of the first and second terminals furthermore depends on the respective transmission power of the radio signals exchanged between the first and second terminals and the fixed station.

25. The station controller according to claim 24, wherein an integer k designates the first terminal and an integer M greater than or equal to 2 is such that there exist M−1 second terminals, in which the complex weighting coefficients $w_i^j$, with $1 \leq i \leq N$, $N \geq 2$, j integer different from k, are associated with the radiating elements i of an antenna of the fixed station in respect of a radio signal exchanged with a mobile terminal j from among the M−1 second mobile terminals, in which the complex weighting coefficients $w_i^k$ are associated with the radiating elements in respect of a radio signal exchanged with the mobile terminal k, in which $p^j$ and $p^k$ are the transmission powers in respect of the radio signals exchanged between the fixed station and the mobile terminal j and the mobile terminal k respectively, and in which the comparison between the information relating to the send/receive parameters determined in respect of the first and second terminals corresponds to the ratio $$\frac{\sum_{i \in \{1 \ldots N\}} \sqrt{P^k} \times (w_i^{k*} \cdot w_i^k)}{\sum_{j \in \{1 \ldots M\}, j \neq k} \sqrt{P^j} \times \left( \sum_{i \in \{1 \ldots N\}} w_i^{k*} \cdot w_i^j \right)}.$$

26. The station controller according to claim 20, comprising means for periodically evaluating the comparison between the information relating to the send/receive parameters determined in respect of the first and second terminals so as to generate a reconfiguration request for the channel in respect of the first terminal.

27. The station controller according to claim 20, furthermore comprising means of estimation of speed of the first mobile terminal at least, wherein the allocation of a code nonorthogonal to at least one code of the set already allocated to another channel set up in respect of a second mobile terminal in the cell by the means for conditionally allocating a code to the channel to be set up or to be reconfigured in respect of the first terminal is further conditioned on the estimated speed.

28. The station controller according to claim 27, wherein the means of estimation of speed comprises means of estimation of an angular speed of the mobile terminal comprising means of storage of a plurality of the information received, relating to the send/receive parameters determined in respect of the terminal and the fixed station and means of estimation of a variation of the information received over a time period.

29. The station controller according to claim 20, furthermore comprising means of estimation of a sense of movement of the first and second mobile terminals, wherein the means for conditionally allocating a code to the channel to be set up or to be reconfigured in respect of the first terminal further conditions the allocation on the estimations of the senses of movement.

30. The station controller according to claim 29, comprising means for subjecting the comparison between the information relating to the send/receive parameters determined in respect of the first and second terminals to a more severe criterion if the estimations of the senses of movement show a mutual approaching of the first terminal and the second terminal.

31. The station controller according to claim 20, wherein the means for conditionally allocating a code perform the allocation, to the said channel, of a code nonorthogonal to at least one code of the set already allocated to another channel set up in respect of a second mobile terminal in the cell, when the comparison between the information received, relating to the send/receive parameters determined in respect of the first and second terminals, exhibits a discrepancy greater than a threshold.

32. The station controller according to claim 20, wherein the means for conditionally allocating allocates a code nonorthogonal to at least one code already allocated to another channel set up in respect of a second terminal from among the codes of the set of codes that are not allocated to the channel to be set up or to be reconfigured in respect of the first terminal such that the comparison between the information relating to the send/receive parameters determined in respect of the first and second terminals exhibits a maximum discrepancy.

* * * * *